United States Patent [19]

Bird et al.

[11] 4,230,585
[45] Oct. 28, 1980

[54] FIRE-RETARDANT CELLULOSE INSULATION AND PROCESS FOR MAKING SAME

[75] Inventors: Thomas O. Bird, Idaho Falls; Jack White, Rigby; Carl H. Bird, Idaho Falls, all of Id.

[73] Assignee: White-Bird Enterprises, Inc., Rigby, Id.

[21] Appl. No.: 961,088

[22] Filed: Nov. 15, 1978

[51] Int. Cl.² ............................................. C09K 3/28
[52] U.S. Cl. .............................. 252/8.1; 106/18.12; 106/204; 162/159; 252/62
[58] Field of Search ............................ 106/18.12, 204; 252/8.1, 62; 424/69; 162/159

[56] References Cited

U.S. PATENT DOCUMENTS

| | | | |
|---|---|---|---|
| 1,932,807 | 10/1933 | Valdastri | 106/204 |
| 3,278,383 | 10/1966 | White et al. | 424/69 |
| 3,458,327 | 7/1969 | Fraser | 252/8.1 |
| 3,558,486 | 1/1971 | Morgenthaler | 252/8.1 |
| 4,089,785 | 5/1978 | Johnson | 252/8.1 |

FOREIGN PATENT DOCUMENTS

| | | | |
|---|---|---|---|
| 454507 | 2/1949 | Canada | 162/159 |
| 748236 | 6/1933 | France | 424/69 |

*Primary Examiner*—Leland A. Sebastian
*Attorney, Agent, or Firm*—J. Winslow Young; H. Ross Workman; Rick D. Nydegger

[57] ABSTRACT

A fire-resistant, cellulose insulation and method, the cellulose insulation including a predetermined quantity of talc to impart the desired degree of fire-resistant characteristics to the cellulose. If desired, limited quantities of boron compounds can be added with the talc. The method includes directing ground cellulose from the primary grinding stage into a surge bin to accommodate metering the talc with the cellulose to thereby assure the appropriate distribution ratio of talc in the cellulose.

13 Claims, 1 Drawing Figure

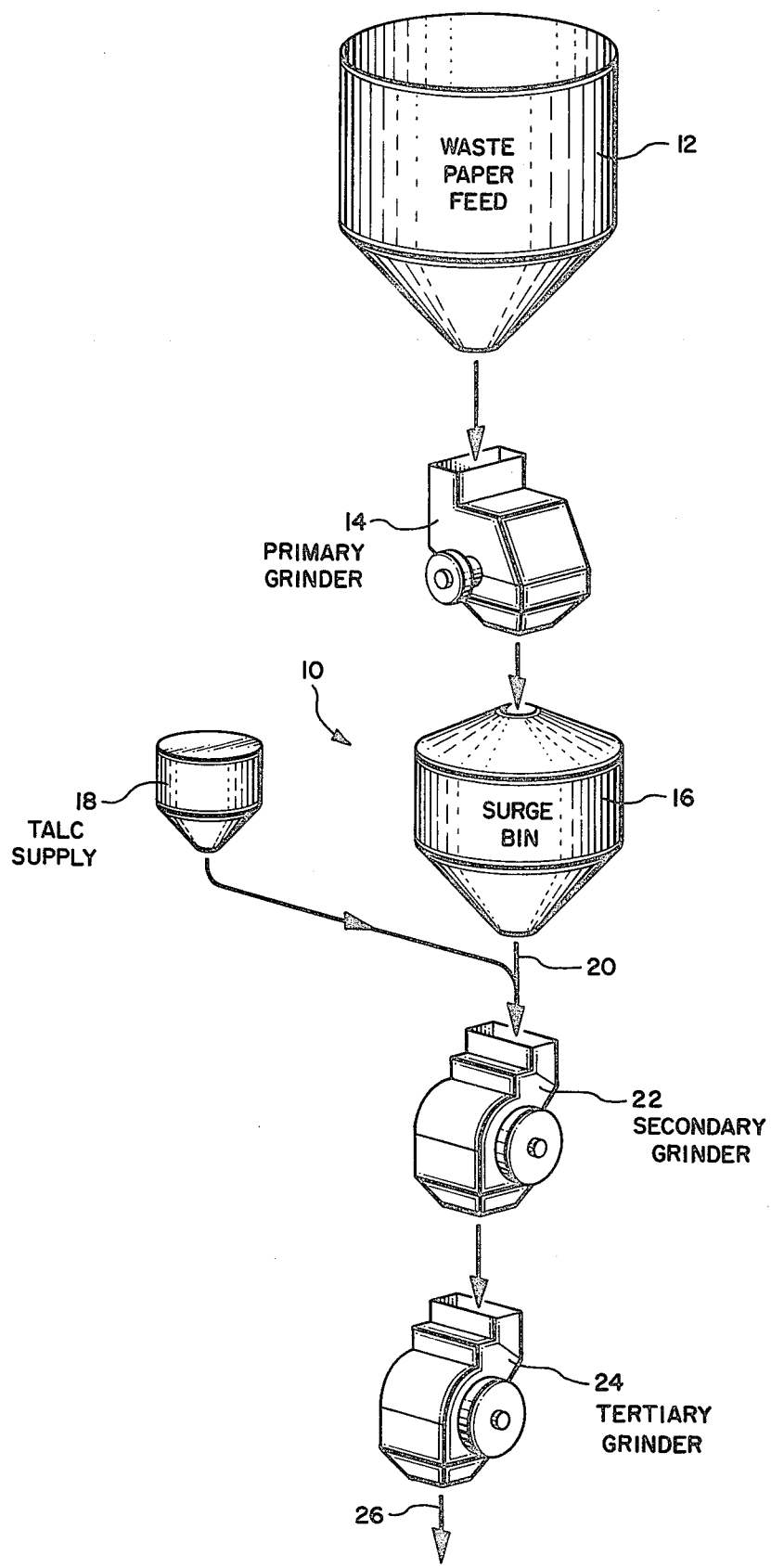

FIRE-RETARDANT CELLULOSE INSULATION AND PROCESS FOR MAKING SAME

BACKGROUND

1. Field of the Invention

This invention relates to a cellulose insulation product and method and, more particularly, to a fire-resistant, cellulose insulation product and method wherein talc is intimately blended with the cellulose to impart the necessary fire-resistant characteristics to the cellulose.

2. The Prior Art

Recent events relating to the availability and cost of fuels has resulted in an increased interest in structural insulation products. The primary feature of any insulation is the ability to impede conductive and convective heat losses by forming minute air pockets in a nonconductive or low thermal conductive matrix. The air pockets form an effective dead air space or barrier against the conductive and convective heat losses. A finely divided cellulose material has been found to be extremely useful as an insulation product since the cellulose has very low thermal conductivity and can be shredded or otherwise finely divided to provide the desirable air entrapment characteristics. Suitably treated, the cellulose also maintains a desired degree of dimensional stability referred to in the trade as "loft". Additionally, insulation quality cellulose is readily available from recycled cellulose products such as newsprint, cardboard and kraft paper. These raw materials are readily recoverable from the waste disposal systems of most communities.

However, cellulose is carbonaceous and a finely divided cellulose product is, therefore, extremely flammable in view of the enormous surface area exposed for combustion. Accordingly, it has been conventional to mix a predetermined quantity of a fire-resistant material such as a boron compound with the cellulose. The boron compounds generally include boric acid, borax and borates.

Additionally, certain cellulose insulation products have included ammonium sulfate as the fire-resistant material. However, recent governmental regulations have required the discontinuance of cellulose insulation products incorporating ammonium sulfate as the fire-resistant material. Ammonium sulfate is believed to be deleterious since it combines with moisture to form acidic byproducts which have been found to cause corrosive damage to electrical wiring, etc.

Although cellulose insulation is used only in sheltered locations, exposure to atmospheric moisture is of considerable importance. Conventionally, the insulation is incorporated in a dwelling as an overlayment in the attic above the ceiling and is blown in while, simultaneously, being fluffed by the action of the blowing process. Most attics are ventilated and exhaust systems from bathrooms, range hoods and the like are directed into the attic space for subsequent dispersal to the atmosphere through the attic ventilation system. Accordingly, moisture in the heavily moisture-laden air from a bathroom or range hood tends to condense on the exposed insulation on cold days. This condensation has been found to form the acidic byproducts with ammonium sulfate resulting in their being proscribed by governmental regulations.

Additionally, other fire-resistant compounds that are soluble are known to "migrate" under the effect of moisture. This migration results from the periodic solubilization upon moisture condensation and recrystallization upon moisture evaporation of the soluble compounds with the result that the solubilized compounds are removed from portions of the cellulose. The exposed cellulose is thereby deprived of its fire-resistant protection with a resulting, potentially dangerous condition.

The production of fire-resistant, cellulose insulation material also requires extensive grinding and mixing of the fire-resistant materials with the cellulose insulation. While various fire-resistant materials have been tried, they tend to be abrasive to the grinding equipment resulting in excessive equipment wear, downtime, and corresponding production loss.

In view of the foregoing, it would, therefore, be a significant advancement in the art to provide a fire-resistant, cellulose insulation material which is (1) relatively available as a raw material and, therefore, relatively inexpensive to obtain, (2) inert to occassional contact with condensation, and (3) low in abrasion of grinding equipment. Such a fire-resistant cellulose insulation material and method is disclosed and claimed herein.

BRIEF SUMMARY AND OBJECTS OF THE INVENTION

The present invention relates to any novel, fire-resistant, cellulose insulation product wherein talc is incorporated with the cellulose to impart the desired fire-resistant characteristics to the cellulose. The talc is introduced into the cellulose during the grinding process to impart the desired fire-resistant characteristics to the cellulose. The relatively low hardness of the talc minimizes machinery abrasion. Talc is also abundantly available as earthen deposits so that it is less expensive to use than the conventional boron compounds.

It is, therfore, a primary object of this invention is to provide improvements in fire-resistant, cellulose insulation.

Another object of this invention is to provide an improved method for producing a fire-resistant, cellulose insulation material.

Another object of this invention is to provide a fire-resistant, cellulose insulation material wherein talc provides the primary fire-resistant characteristic to the insulation.

Another object of this invention is to provide a fire-resistant cellulose insulation material wherein the fire-resistant material has low abrasive characteristics to reduce equipment wear.

These and other objects and features of the present invention will become more fully apparent from the following description and appended claims taken in conjunction with the accompanying drawing.

BRIEF DESCRIPTION OF THE DRAWING

The FIGURE is a schematic flow diagram for one presently preferred embodiment for practicing the method of this invention.

DETAILED DESCRIPTION OF THE PREFERRED EMBODIMENTS

The invention is best understood by reference to the drawing wherein like parts are designated with like numerals throughout.

General Discussion

Talc is a naturally occuring magnesium silicate ($3MgO.4SiO_2.H_2O$) and is frequently referred to by various names including, for example, talcum, soapstone, rensselaerite, potstone, steatite and French chalk. Advantageously, talc is one of the softer minerals and has a hardness of between 1.0 and 1.5 in terms of the Mohs' Scale. Furthermore, talc is relatively insoluble in water. A finely divided talc will tend to float on water and resist wetting. Since talc is a combination of the oxides of magnesium and silicon, talc will not support combustion. A representative analysis of the composition of talc obtained from a commercial mining operation is set forth in Table I, below.

TABLE I

| ANALYSIS OF MINE GRADE TALC | |
|---|---|
| Compound | Weight % |
| MgO | 29.0 |
| $SiO_2$ | 62.5 |
| $Al_2O_3$ | 1.9 |
| $Fe_2O_3$ | 1.9 |
| $TiO_2$ | 0.15 |
| $K_2O$ | 0.09 |
| CaO | 0.005 |
| Weight Loss On Heating | 5.5 |

The weight loss on heating is believed to represent water loss. Water loss does not interfere with the fire-resistant characteristics imparted by the talc. On the contrary, it is believed that the water loss on heating contributes to the fire-resistant characteristics since the water absorbs a portion of the thermal energy which would otherwise tend to char or coke the cellulose. Surprisingly, it was discovered in the development of the present invention that talc, when intimately mixed with a highly combustible material such as finely divided cellulose, was found to be even more effective as a fire-resistant material than the conventional boron compounds or ammonium sulfate. This is believed to be a result, in part, of the tendency for the water molecule portion of the talc to absorb and remove a portion of the thermal energy which would otherwise char the cellulose. This was experimentally demonstrated when a sample of the fire-resistant, cellulose of this invention was subjected to the flame of a blow torch with minimal thermal degradation. This latter characteristic is particularly useful since any carbonaceous material will tend to coke upon the application of heat, the coking process producing highly combustible gases such as carbon monoxide, methane and the like. Accordingly, a fire-resistant material such as talc is particularly advantageous when incorporated with a highly combustible material such as finely divided cellulose.

Another surprising discovery made as a result of this invention is that the talc is not only insoluble but appears to impart a desirable degree of hydrophobicity to the cellulose insulation material. Being insoluble, talc has a very low tendency to migrate or otherwise leave the cellulose without fire-resistant protection while, to a lesser extent, the finely divided talc also assists in forming a limited, water-repellant coating on the cellulose.

Additionally, it was discovered at the inherent softness of the talc contributed greatly toward its intimate dispersion throughout the cellulose material while minimizing abrasive wear on the grinding machinery. On the other hand, siliceous materials such as perlite tended to cause excessive machinery wear.

The cellulose material useful in this invention may be readily supplied from various sources although the principle source consists of recycled newsprint, cardboard, kraft paper and the like. Newsprint is especially desirable since it provides a certain degree of uniformity to the raw material and may be obtained for a relatively nominal cost per ton.

The Embodiment of the Drawing

With particular reference to the drawing, a flow diagram, shown generally at 10, is schematically illustrated and includes a waster paper feed 12, a primary grinder 14, a surge bin 16, a talc supply 18, a secondary grinder 22, and, where desirable, a tertiary grinder 24. Cellulose from waste paper feed 12 is directed into the primary grinder 14 which reduces the waste paper to a substantially uniform mass of cellulose. Primary grinder 14 is substantially a conventional grinder and is adapted to receive newsprint, cardboard, kraft paper and the like. The ground cellulose from primary grinder 14 is introduced into a surge bin 16.

The function of surge bin 16 is to accommodate the controlled admixing of talc from talc supply 18 with cellulose from primary grinder 14. Surge bin 16 provides a particularly useful function since cellulose is discharged from primary grinder 14 in relatively nonuniformed clumps or masses and in surges. An outlet 20 is provided for surge bin 16 and may be configurated in the form of a screw conveyer or the like for the purpose of directing a predetermined quantity of cellulose from surge bin 16 into secondary grinder 22. The rate of feed from talc supply 18 is coordinated with regulator of outlet 20 so as to admix talc with the cellulose on a ratio generally between about 5-25%, by weight, talc to cellulose.

Secondary grinder 22 and tertiary grinder 24 are each configurated as high-speed grinders. In one presently preferred embodiment of this invention secondary grinder 22 and tertiary grinder 24 were each configurated as high-speed hammer mills having a tip speed of the hammers of 20,000 feet per minute. Conventional hammer mills were modified and suitably balanced to accommodate this high speed. Advantageously, the relatively softness of the talc did not induce excessive wear of the mechanical equipment of grinders 22 and 24.

Introduction of talc from talc supply 18 prior to the secondary grinder 22 has the additional advantage in that the talc greatly reduces the fire hazard present during the grinding process. For example, newsprint, cardboard, and kraft paper from the waste paper feed contains stones or metallic debris such as staples and the like which encourage spark formation during the high-speed grinding process. However, with the talc present in the grinder, the opportunities for ignition are substantially minimized thereby contributing significantly to the safety of the grinding process.

In one experimental sample, boric acid in an amount of up to 10% by weight was introduced with the talc from talc supply 18 making the total fire-resistant material in the cellulose approximately 25% by weight. Although boric acid is known for its fire-resistant properties, no increased fire resistance capability could be ascertained by the inclusion of boric acid therein. Although boric acid is not determined to be detrimental, it could not be adequately determined whether the boric acid contributed any fire-resistant properties to the insulation material other than that which was obtainable by the use of talc according to this invention. However, where necessary to comply with existing code requirements, it may be necessary to include known boron compounds with the talc until the use of talc alone has met with sufficient acceptance.

In light of the relatively high grinding speeds, particularly in secondary grinder 22 and tertiary grinder 24, as one phase of the experimental procedure, a non-flammable oil was introduced into the grinding process as a dust suppressant. For example, a commercially available silicone oil was introduced into the grinding process in amounts up to 5% by weight and was found to suppress dust formation. Silicone oil is known also for its resistance to wetting. The silicone oil also appeared to enhance the adhesion between the talc and the cellulose material. Excessive dust suppression is not necessarily indicated as being an ultimate goal since a certain amount of talc dust in each of grinders 22 and 24 appears to be desirable for suppression of ignition.

Fire-resistant, cellulose insulation is discharged through outlet 26 from tertiary grinder 24 and was found to have a desirable degree of intermix between the talc and the cellulose. The cellulose was also found to be very finely divided as a result of the high-speed grinding process. Both the intimate dispersion and fine division are a direct result of the high-speed grinding process which is obtainable, in large part, as a result of the very soft nature of talc.

The invention may be embodied in other specific forms without departing its spirit or essential characteristics. The described embodiments are to be considered in all respects only as illustrative and not restrictive and the scope of the invention is, therefore, indicated by the appended claims rather than the foregoing description. All changes that come within the meaning and range of equivalency of the claims are to be embraced within their scope.

What is claimed and desired to be secured by a United States Letters Patent is:

1. A fire-resistant, cellulose insulation consisting of a finely divided cellulose intimately mixed with talc, the talc being present in an amount within the range on the order of about 5% to 25% by weight.

2. A fire-resistant, cellulose insulation comprising a finely divided cellulose intimately mixed with talc, the talc being present in an amount within the range on the order of about 5% to 25% by weight and wherein a boron compound is added to the talc in amounts ranging up to 10% by weight.

3. The fire-resistant, cellulose insulation defined in claim 2 wherein the boron compound is selected from the group consisting of borax, boric acid, and borates.

4. The fire-resistant, cellulose insulation defined in claim 1 wherein a non-flamable, silicone oil is added to the cellulose and talc in amounts ranging up to about 5% by weight.

5. A method for producing a fire-resistant, cellulose insulation comprising:
   grinding a cellulose raw material in a first grinding stage;
   imparting a fire-resistant characteristic to the cellulose with an inorganic material consisting of talc by mixing the talc with the ground cellulose; and
   finely grinding the cellulose and talc mixture thereby providing a substantially uniform distribution of the talc throughout the cellulose.

6. A method of claim 5 wherein the cellulose raw material is selected from the group consisting of newsprint, kraft paper, and cardboard.

7. The method of claim 5 wherein the talc is added to the cellulose in an amount within the range on the order of about 5% to 25%, talc by weight.

8. The method of claim 5 wherein the process further comprises introducing the ground cellulose from the first grinding stage into a surge bin to accommodate improved control over the mixing ratio of talc with the cellulose.

9. The method of claim 5 wherein the mixing step further comprises incorporating boric acid with the talc in amounts ranging up to 10% by weight.

10. The method of claim 5 wherein the mixing step further comprises injecting a nonflammable oil into the talc and cellulose mixture, the oil suppressing dust and improving adherence between the talc and the cellulose.

11. The method of claim 10 wherein the oil is a silicone oil and is added to the mixture in amounts less than 5% by weight.

12. The method of claim 5 wherein the finely grinding step further comprises grinding the talc and cellulose in a hammermill having a hammer tip speed greater than about 20,000 feet per minute.

13. A method for producing a fire-resistant, cellulose insulation comprising:
   subjecting a cellulose material to an initial grinding step;
   introducing the ground cellulose into a surge bin to accommodate a controlled processing of the ground cellulose;
   mixing talc with the ground cellulose in an amount within the range on the order of about 5% to 25% by weight talc to ground cellulose;
   adding a boron compound to the talc in amounts ranging up to 10% by weight; and
   blending the talc and boron compound with the cellulose by subjecting the talc, boron compound and cellulose mixture to additional grinding.

* * * * *